(12) United States Patent
Tenbusch, II

(10) Patent No.: US 6,588,983 B1
(45) Date of Patent: *Jul. 8, 2003

(54) TRENCHLESS PIPE REPLACEMENT APPARATUS AND TECHNIQUE

(76) Inventor: Albert A. Tenbusch, II, 2206 Marble Falls, Carrollton, TX (US) 75007

( * ) Notice: Subject to any disclaimer, the term of this patent is extended or adjusted under 35 U.S.C. 154(b) by 0 days.

This patent is subject to a terminal disclaimer.

(21) Appl. No.: 09/386,664

(22) Filed: Aug. 31, 1999

Related U.S. Application Data

(60) Division of application No. 09/033,940, filed on Mar. 2, 1998, now Pat. No. 6,039,505, which is a division of application No. 08/584,525, filed on Jan. 8, 1996, now Pat. No. 5,816,745, which is a continuation-in-part of application No. 08/098,454, filed on Jul. 27, 1993, now Pat. No. 5,482,404.

(51) Int. Cl.$^7$ ................................................ F16L 1/00
(52) U.S. Cl. .......................... 405/184.3; 405/184.1; 254/29 R
(58) Field of Search ................ 405/154, 184–184.5, 405/146, 150.1, 174, 154.1; 254/295; 138/97

(56) References Cited

U.S. PATENT DOCUMENTS

| | | |
|---|---|---|
| 3,362,167 A | 1/1968 | Ward |
| 3,708,984 A | 1/1973 | Coleman |
| 3,791,151 A | 2/1974 | Plank |
| 4,091,630 A | 5/1978 | Nemoto et al. |
| 4,091,631 A | 5/1978 | Cherrington ................ 405/184 |
| 4,116,011 A | 9/1978 | Girault ........................ 405/134 |
| 4,176,985 A | 12/1979 | Cherrington ................ 405/184 |
| 4,507,019 A | 3/1985 | Thompson ................... 405/154 |
| 4,576,515 A | 3/1986 | Morimoto et al. .......... 405/184 |
| 4,626,134 A | 12/1986 | Coumont ..................... 405/184 |
| 4,634,313 A | 1/1987 | Robbins ...................... 405/184 |
| 4,637,756 A | 1/1987 | Boles .......................... 405/184 |

(List continued on next page.)

FOREIGN PATENT DOCUMENTS

| | | | |
|---|---|---|---|
| EP | 0060124 | 9/1982 | ................. 405/184 |
| EP | 01470954 | 7/1985 | |
| EP | 0342246 | 11/1989 | |
| EP | 0 392 583 A2 | 10/1990 | |
| GB | 2213904 | 8/1989 | ................. 405/184 |
| JP | 2-176094 | * 7/1990 | |
| JP | 7-55057 | * 3/1995 | |
| WO | 8703353 | 6/1987 | |
| WO | 9522677 | 8/1995 | |

OTHER PUBLICATIONS

TRS Publication—TRS—Applications.
TRS Publication—Fast, Low–Cost Non–Distruptive Trenchless Pipeline Replacement (undated).

(List continued on next page.)

OTHER PUBLICATIONS

TRS Publication—TRS LC–25 Laterals Replacement Machine (1987).

(List continued on next page.)

*Primary Examiner*—Heather Shackelford
*Assistant Examiner*—Sunil Singh
(74) *Attorney, Agent, or Firm*—Roger N. Chauza, Esq.; Chauza & Handley, L.L.P.

(57) ABSTRACT

The apparatus and technique of the invention constitutes a hydraulic jack system for pushing sections of new pipe which, in turn, pushes a sleeve-cone expander arrangement to break up the old pipe and define a straight path for the new pipe. Apparatus is employed to determine the skin friction and the penetration friction, and to dispense a lubricant to reduce such frictional forces.

33 Claims, 9 Drawing Sheets

U.S. PATENT DOCUMENTS

| | | | | |
|---|---|---|---|---|
| 4,648,746 | A | 3/1987 | Abinett | 405/154 X |
| 4,674,914 | A | 6/1987 | Wayman et al. | 405/154 |
| 4,720,211 | A | 1/1988 | Streatfield et al. | 405/154 |
| 4,732,222 | A * | 3/1988 | Schmidt | 405/184 X |
| 4,738,565 | A | 4/1988 | Streatfield et al. | 405/154 |
| 4,789,268 | A | 12/1988 | Yarnell | 405/154 |
| 4,830,539 | A | 5/1989 | Akesaka | 405/184 |
| 4,848,964 | A | 7/1989 | Yarnell | 405/154 |
| 4,886,396 | A | 12/1989 | Akesaka | 405/184 |
| 4,915,543 | A | 4/1990 | Akesaka | 405/156 |
| 4,925,344 | A | 5/1990 | Peres et al. | 405/184 |
| 4,930,542 | A | 6/1990 | Winkle et al. | 138/98 |
| 4,944,634 | A | 7/1990 | Alexander et al. | 405/184 |
| 4,958,959 | A | 9/1990 | St. Onge | 405/184 |
| 4,983,071 | A | 1/1991 | Fisk et al. | 405/154 |
| 4,990,028 | A | 2/1991 | Alexander et al. | 405/184 |
| 5,048,793 | A | 9/1991 | Mefford et al. | 254/29 R |
| 5,069,426 | A | 12/1991 | Gabrysch | 254/29 R |
| 5,076,731 | A | 12/1991 | Luksch | 405/154 |
| 5,112,158 | A | 5/1992 | McConnell | 405/154 |
| 5,125,768 | A | 6/1992 | Ilomaki | 405/150.1 |
| 5,163,520 | A | 11/1992 | Gibson et al. | 175/19 |
| 5,171,106 | A | 12/1992 | Rockower et al. | 405/156 |
| 5,173,009 | A | 12/1992 | Moriarty | 405/154 |
| 5,205,671 | A | 4/1993 | Handford | 405/154 |
| 5,209,605 | A | 5/1993 | Cherrington | 405/184 |
| 5,211,509 | A | 5/1993 | Roessler | 405/184 |
| 5,282,696 | A | 2/1994 | Solomon et al. | 405/184 |
| 5,306,101 | A | 4/1994 | Rockower et al. | 405/154 |
| 5,328,297 | A | 7/1994 | Handford | 405/184 |
| 5,439,320 | A | 8/1995 | Abrams | 405/154 |
| 5,484,232 | A | 1/1996 | Hayashi et al. | 405/184 |
| 5,785,458 | A * | 7/1998 | Handford | 405/184 |

OTHER PUBLICATIONS

TRS Publication—Description of Operations(1987).

PIM Publication—Cost Effective Pipeline Replacement Systems from PIM Corporation (1988).

Miller Introduces a 'Breakthrough' in Pipeline Replacement, Miller Pipeline Corp., 1990.

Derwent Abstract Accession No. 91–281561, Publication No. WO91/13283, 1991.

"No–Dig™ Microtunneling and Slip–Lining Pipe" brochure, Division of MCP Industries, Inc., Mar., 1993.

* cited by examiner

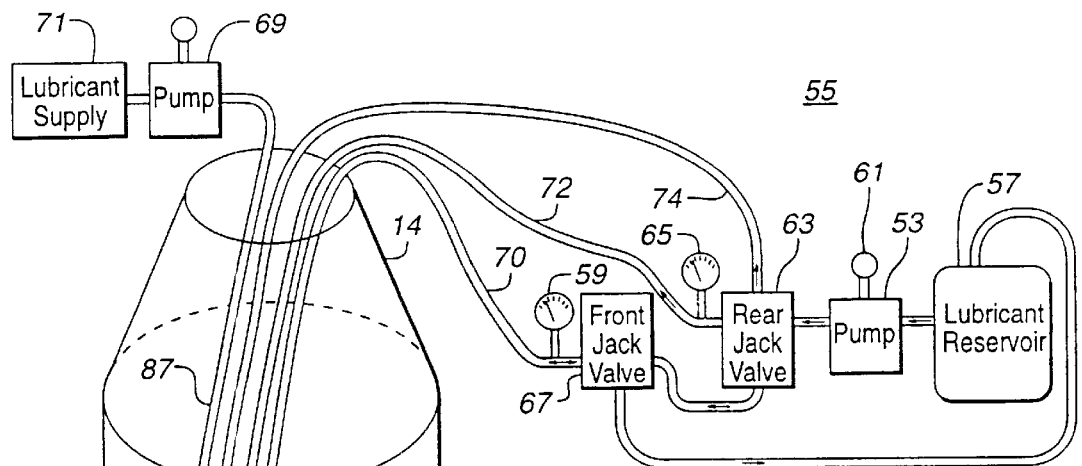
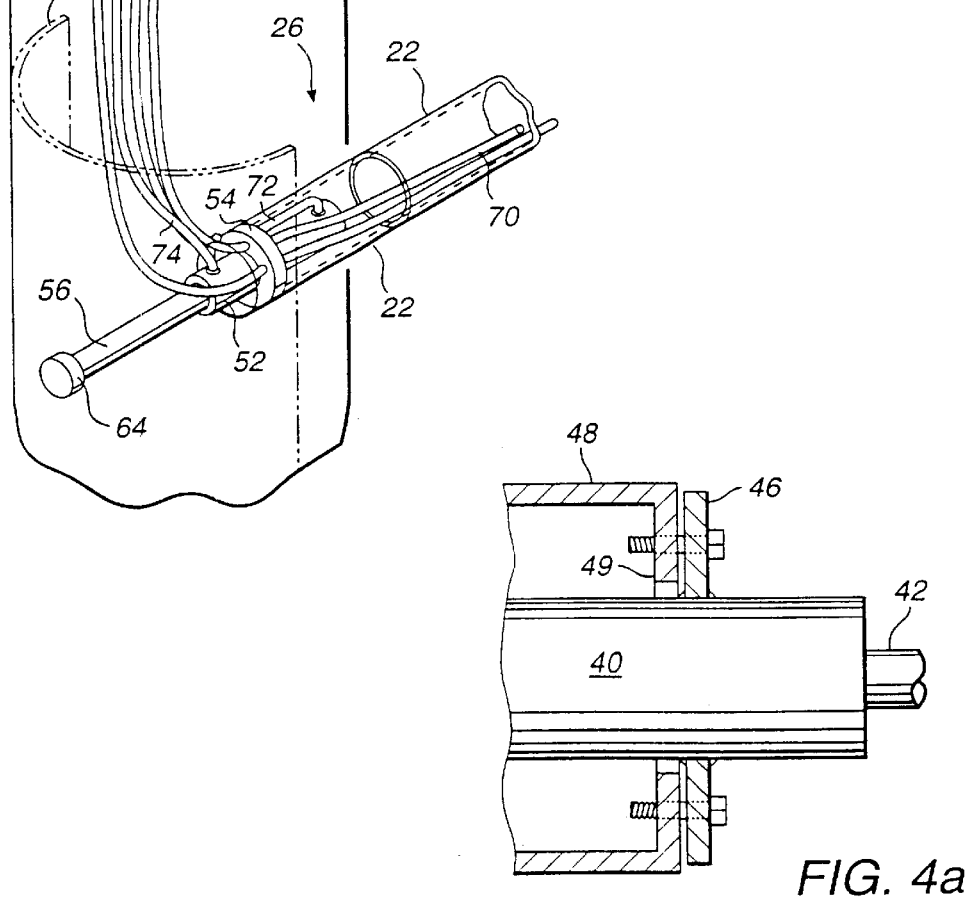
FIG. 2
FIG. 4a

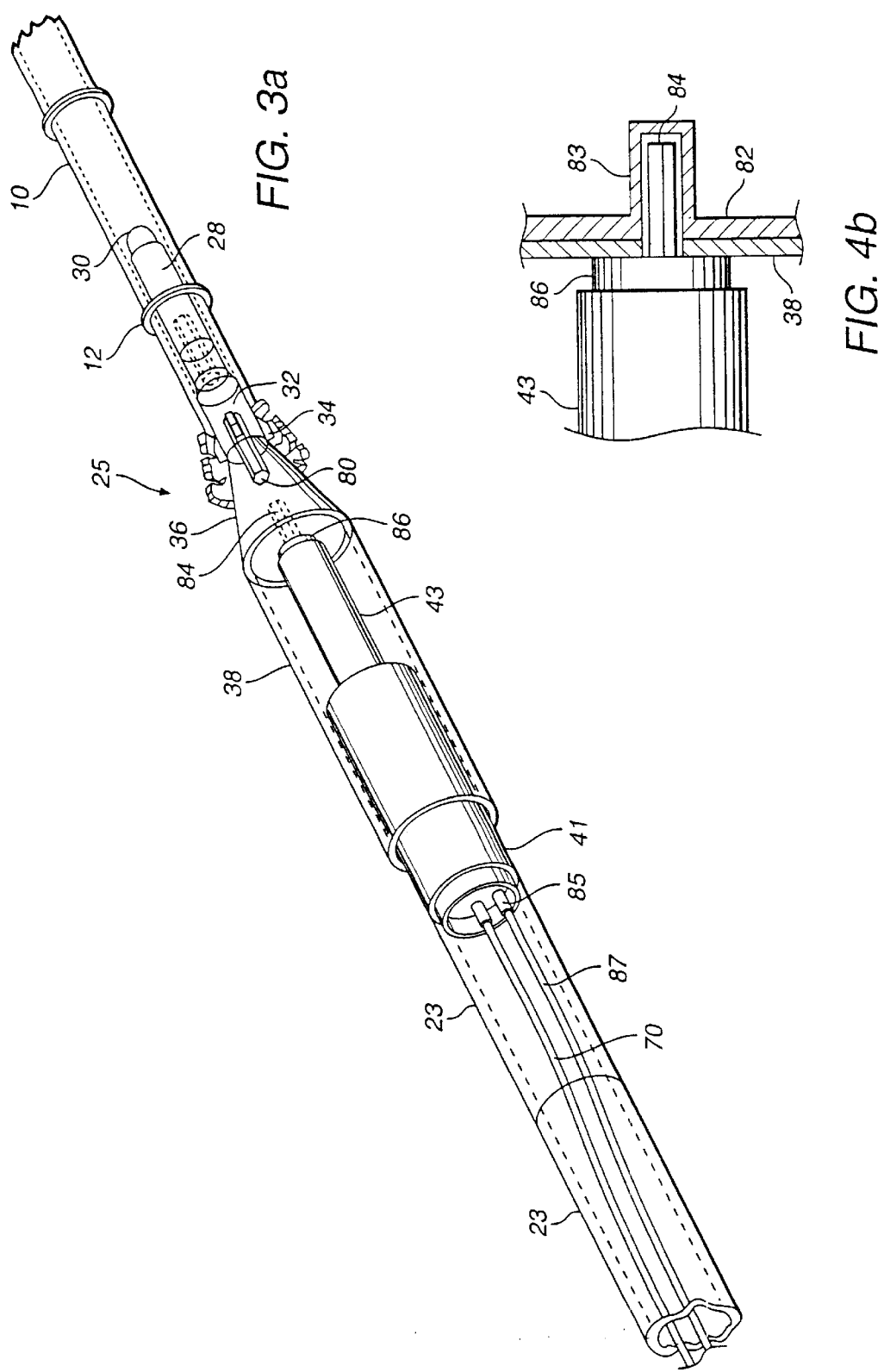

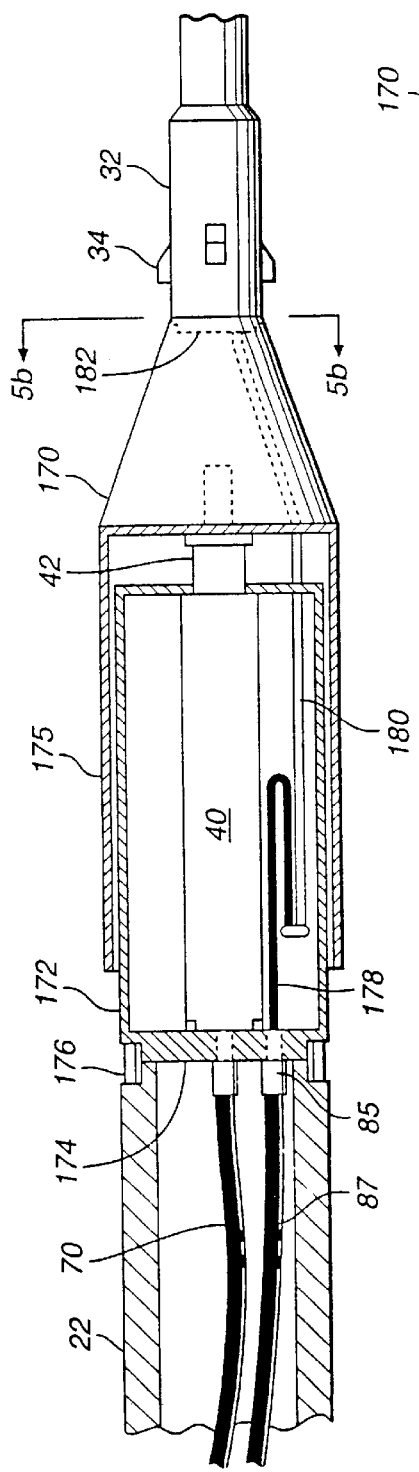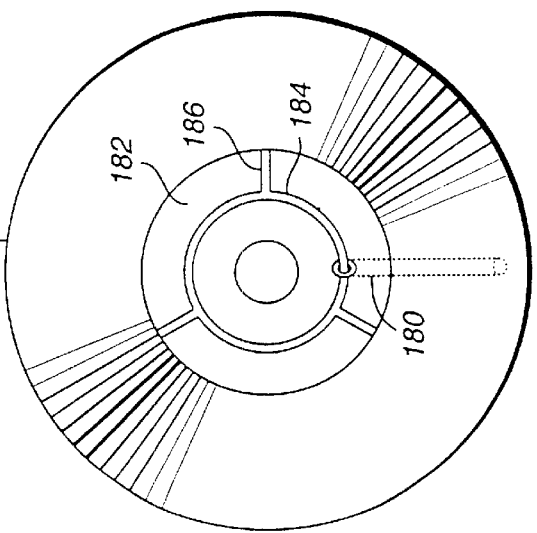
FIG. 5a
FIG. 5b

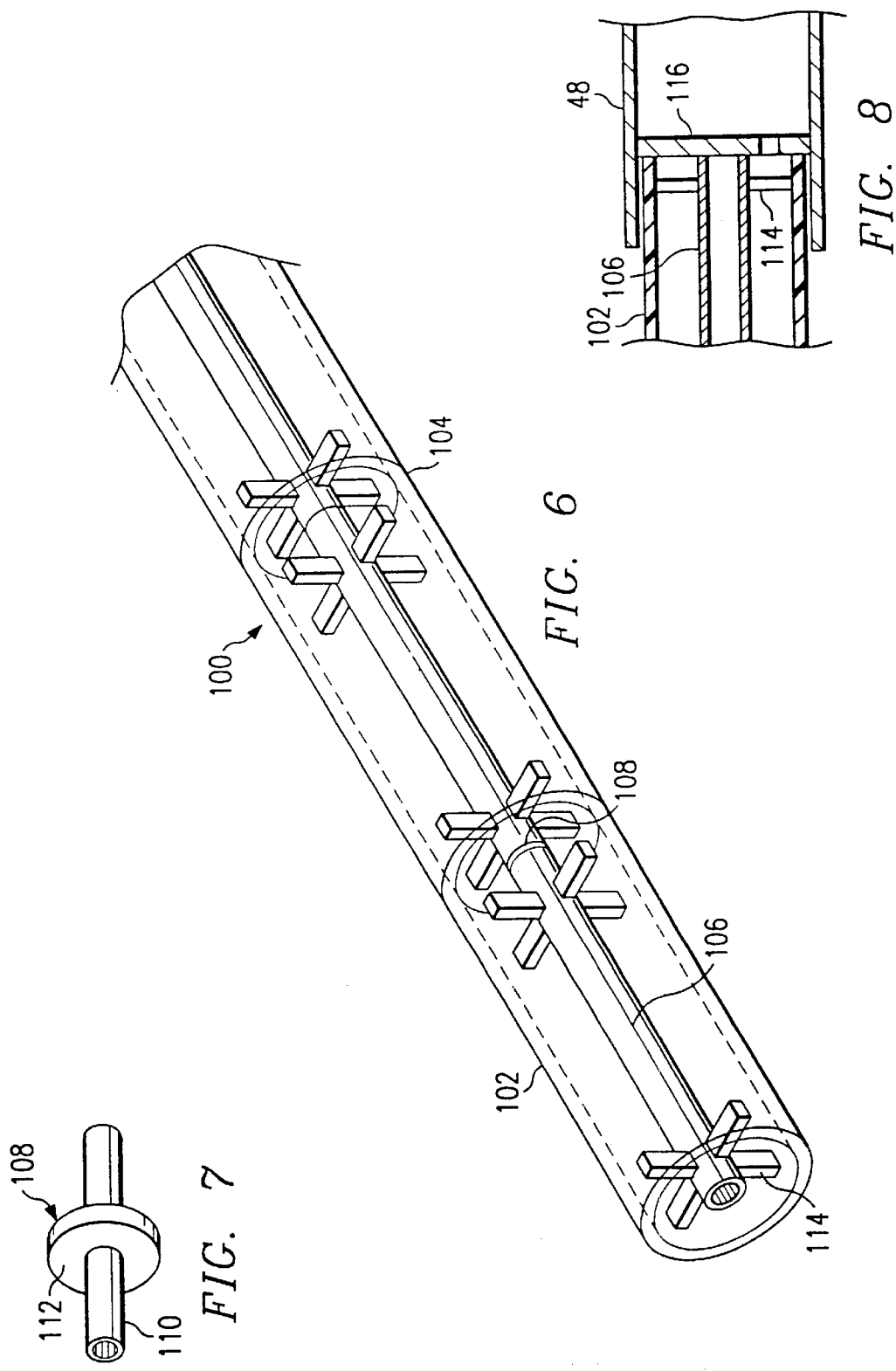

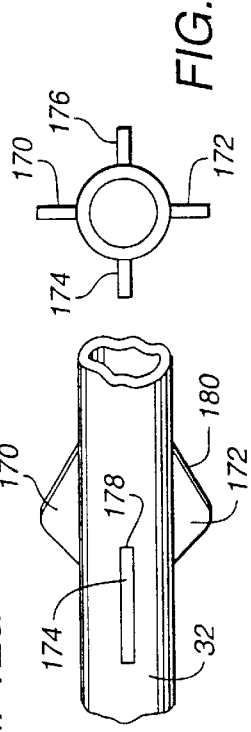
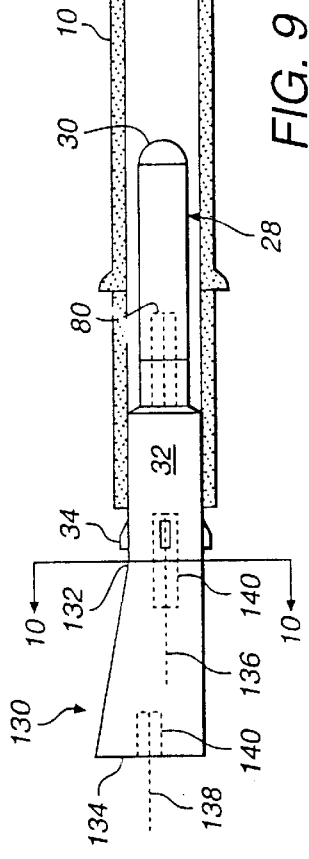
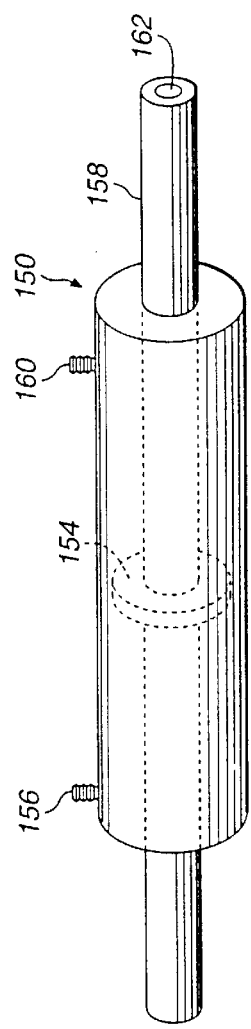
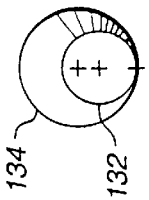

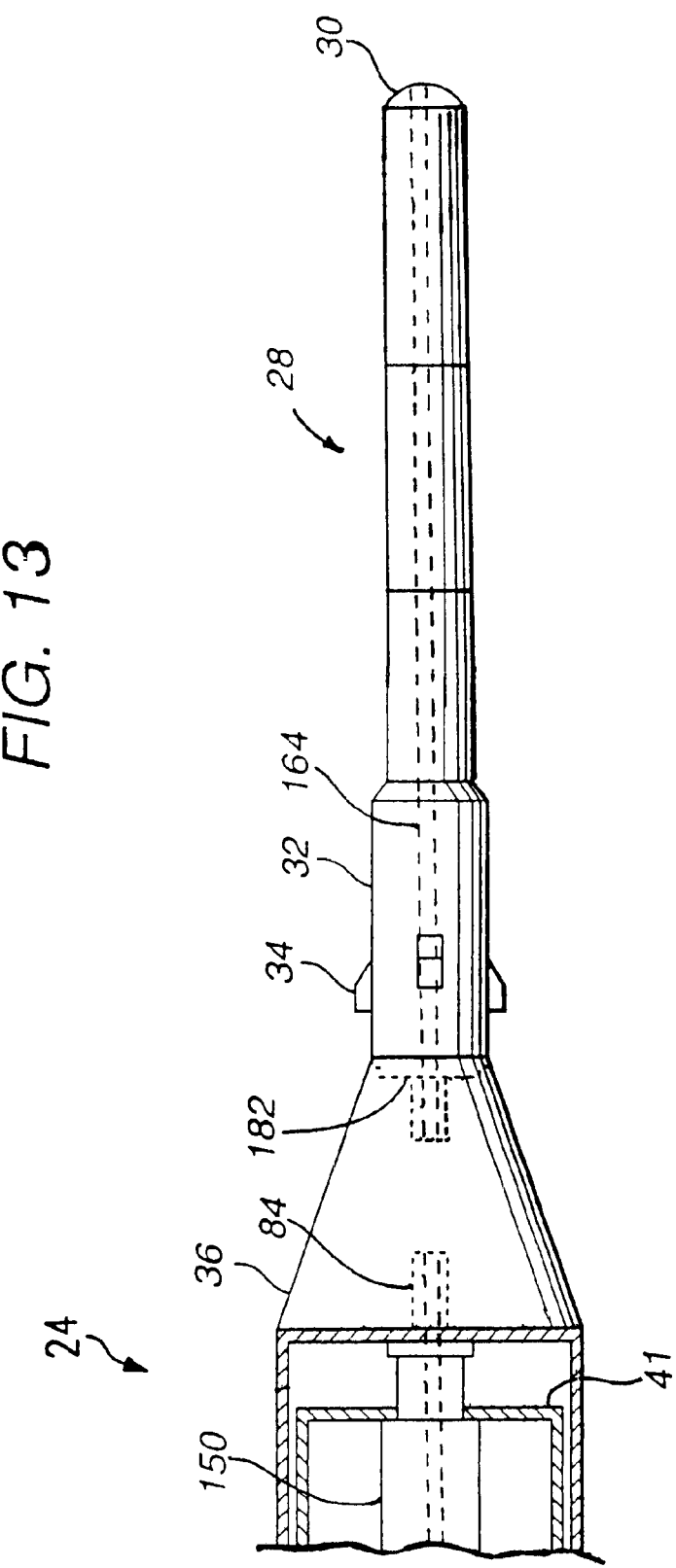

TRENCHLESS PIPE REPLACEMENT APPARATUS AND TECHNIQUE

CROSS-REFERENCE TO RELATED APPLICATIONS

This application is a divisional of U.S. patent application Ser. No. 09/033,940, filed Mar. 2, 1998 now U.S. Pat. No. 6,039,505, the entire disclosure of which is incorporated herein by reference, which is a divisional of U.S. patent application Ser. No. 08/584,525, filed Jan. 8, 1996, now U.S. Pat. No. 5,816,745, which is a continuation-in-part of prior U.S. patent application Ser. No. 08/098,454, filed Jul. 27, 1993, entitled "Underground Pipe Replacement Technique", now assigned U.S. Pat. No. 5,482,404, the entire subject matter of which is incorporated herein by reference.

TECHNICAL FIELD OF THE INVENTION

The present invention relates in general to apparatus for the replacement of deteriorated underground pipes, and more particularly methods and apparatus for breaking up the old underground pipes and forcing new pipes through the path of the broken pipeline.

BACKGROUND OF THE INVENTION

Virtually every city in the United States, as well as in foreign countries, employs sanitary drainage systems and sewage disposal systems. A vast network of underground pipes is effective to carry the waste water and sewage to the respective disposal systems. The underground piping systems are generally constructed of concrete, clay or metal pipes which have a lifetime of many years. However, such piping systems do not last indefinitely. There are many external influences which can reduce the lifetime of such piping systems. For example, an accumulation of acids from the formation of hydrogen sulfide gas in the sewer attacks the material in concrete and asbestos cement pipes. The gases condense on the upper internal surface of the pipe and the resulting acids can deteriorate the pipe so that holes are eventually formed through the sidewalls, or the pipe becomes so porous that it is weakened and easily crumbles. While clay tile is generally not affected by the hydrogen sulfide gas or acids, the quality of the clay used to fabricate the clay tile can be of such inferior quality that the life of the pipe is greatly reduced. Metal pipes can be subject to corrosive action and breakage. Further, the sealed ends of any of these types of pipes can become defective over time, thereby allowing roots to grow therein. As the roots grow in size, the pipes become separated and allow sewage or waste water to leak into the surrounding soil. The movement of the soil such as by frost, shifting or earthquakes is another mechanism which can cause leaks in the piping system.

A recent concern of the integrity of the national underground piping systems is that of the environment affected by the piping system. Numerous environmental regulations have been implemented to control the integrity of the underground piping systems to preserve the quality of the water, air and soil. In view of the foregoing, a substantial concern has been generated over the quality of the present underground piping systems throughout the United States, and techniques for replacing the same due to the age or deterioration of the pipes themselves or entire systems.

Various techniques and apparatus have been developed for addressing the problem of replacing underground pipes, and especially sewer pipes. A major concern for the replacement of underground pipes is that of minimizing the disturbance of private or public property in replacing the pipes. For example, while the trenching or digging with a backhoe is effective to expose the old underground pipes for repair or replacement, such technique is extremely invasive and disturbing of the soil owned by the property owners. Furthermore, such replacement techniques are time consuming and thus represent a substantial interruption in the service to the customers using the underground pipes. To circumvent many of these problems, many techniques and devices have been developed for pulling a "mole" through the old piping system to break it up and provide a channel through which a new pipe is pulled. U.S. Pat. No. 4,983,071 by Fisk, et al. discloses a pipe bursting apparatus which is pulled through the old pipe to break it up, and new pipe attached to the bursting equipment is simultaneously pulled and thus installed in the path of the old pipe. This system requires a cable to be initially routed through the old pipe system and connected to a conical element for pulling through the old system and bursting the pipe. Connected to the conical element is a new plastic pipe which is pulled by the equipment and automatically routed in the path of the old system. U.S. Pat. No. 5,076,731 by Luksch discloses an element that is pulled through the old piping system to form an enlarged bore so that a correspondingly larger new pipe can be installed in lieu of the old pipe. In U.S. Pat. No. 4,930,542 by Winkle, et al., there is disclosed an underground pipe restoring technique for pushing new sections of pipe in the path of the old pipe. In the Winkle, et al. system, a frontal part of the apparatus is hydraulically operated to expand radially outwardly and break up the tile. Once the old tile is broken, a hydraulic ram in the back section pushes the new pipe sections forwardly, as well as pushes the frontal section forwardly into the old pipe. The movement of the apparatus is halted and the frontal element is again actuated to expand radially outwardly and break up the old pipe.

In many of the techniques disclosed in the prior art, the pipe bursting element must be pulled by a cable through the old pipe system. The disadvantage of such a technique is that the cable must be initially routed through the old pipe system, which effort can be extremely difficult if the old pipe system is broken and dirt or debris has otherwise fallen into the pipe. Further, an extremely large area must be dug into the soil at the distant end to provide room for pulling equipment, such as a winch. The prior art also includes pipe bursting equipment that is very complicated and expensive and subject to breakage or inoperability when soil or pieces of broken pipe fall into the mechanism.

From the foregoing, it can be seen a need exists for a new technique and apparatus for replacing underground piping systems without disturbing the surface soil and which can be carried out efficiently and reliably. A further need exists for a technique that can be operated in a manhole to replace old deteriorated pipes extending therefrom. Yet another need exists for a technique for replacing old underground pipes with new clay tile or ductile iron sections by pushing the new pipe sections into the path of the old pipe. Another need exists for a lubricant delivery system for efficiently dispensing a lubricant to reduce the skin friction and penetration friction forces encountered in installing the new pipe sections in the path of the old pipe. These and other needs are met by the features and advantages of the invention which are described in detail below.

SUMMARY OF THE INVENTION

In accordance with the present invention, various techniques and apparatus are disclosed for replacing old or deteriorated underground pipes with new pipes, in such a manner as to eliminate or reduce the problems heretofore encountered. In accordance with an important feature of the invention, a rear hydraulic jack assembly situated in a manhole or excavated pit is effective to push sections of new pipe and also push a frontal jack assembly to break up the old pipe and form a path or burrow for the sections of the new pipe. The frontal apparatus includes a hydraulic jack that has a backplate adapted for mating directly to the frontal edge configuration of the foremost new pipe section. The frontal jack is situated between the foremost new pipe section and a cone expander to push the cone expander. The movement or pushing force exerted on the cone expander can be exerted by a frontal jack, and thus can be independent of the rear hydraulic jack. In this manner, when the force required of the rear jack is insufficient to push both the string of new pipes as well as the cone expander to break up the old pipe, the rear and the frontal jacking apparatus can be operated independently to sequentially break up the old pipe and form a burrow, and then to advance the new pipe in the burrow.

According to the preferred embodiment of the invention, a frontal arrangement includes a rigid, elongate cylindrical sleeve coupled to the back of a cone expander. The cylindrical sleeve is coupled behind the cone expander so that when the arrangement is pushed forwardly, a straight burrow is formed, even if the original path of the pipe has deviations due to settling or the like. The cone expander can be connected to an elongate snout that is pushed inside the old pipes and provides a directional mechanism for routing the frontal arrangement. Directly behind the snout is a tubular section having fins extending radially outwardly therefrom for either fracturing the old pipes or forming lines of weakness therein. The elongate sleeve, the cone expander and other components pushed in the path of the old pipes can be connected together so as to be disassembled for easy assembly or disassembly in a manhole. When the cone expander is assembled so as to be coupled to the elongate sleeve and the elongate finned member and/or snout as the leading apparatus, the cone expander is forced to maintain a straight or linear path.

The rear jacking system is constructed so that it can be situated in a manhole and utilized to push short sections of new pipe into the path of the old piping system, as well as push the frontal jacking system. This is accomplished by a double-action hydraulic jack that can be coupled to a section of the new pipe in the manhole. The jack is then operated to push the new pipe section in a forward direction into the burrow. When the jack is operated to a fully extended position where the section of new pipe is pushed into the path, the jack is disengaged and coupled to another section of new pipe.

According to an alternate embodiment of the cone expander, there is provided a cone which has an offset axis. This type of cone expander is highly useful for replacing old pipes that are laid adjacent to a rock bed or solid sidewall structure, whereby the old pipe and surrounding soil is expanded in a direction away from the solid rock.

In yet other embodiments of the invention, a lubricant is piped from a surface reservoir through the new pipe sections to the frontal jacking apparatus. The lubricant is forced out of holes in the cone expander to reduce the penetration friction as the cone expander is forced through the old pipe system to break it and expand the surrounding soil, thereby reducing the force required of the jacking apparatus.

The frontal jacking apparatus is also structured so that a lubricant is dispensed through ports to reduce the skin friction of the new pipe sections as they are forced forwardly in the burrow. Intermediate lubricators disposed between new pipe sections can be utilized to further facilitate the reduction of skin friction when the new pipe run is long.

According to yet another embodiment of the invention, multi-part pipe sections having an outer synthetic sidewall and an inner rigid steel pipe, can be utilized for replacement of the old underground pipes. In this embodiment, the rigid steel pipes are used as the mechanism in which the rear jack forces the multi-part pipe sections in the path of the old pipes, and which carry with it the synthetic outer sleeve. When the entire line of multi-part piping system has been installed, the inner rigid pipe is removed, whereby the outside synthetic pipe remains for carrying the waste water or sewage.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts or elements throughout the views, and in which:

FIG. 2 is an isometric view of the rear jacking apparatus situated in the manhole, and engaged with a section of the new pipe for pushing thereof into the path of the old pipe;

FIG. 3a is an isometric view of the frontal jacking apparatus according to another embodiment of the invention, as pushed by a foremost section of the new pipe, and shown breaking up the old piping system;

FIG. 4a is a partial sectional view of the connection between the frontal jack collar and the coupling shell;

FIG. 4b is a partial sectional view of the coupling arrangement between the frontal jack and the cone expander;

FIG. 5a is a side view of the coupling shell and cone expander arrangement for providing a lubricant to reduce the pushing force required to break up old pipes and advance new pipes in the path;

FIG. 5b is a frontal view of the cone expander, taken along line 5b —5b of FIG. 5a;

FIG. 6 is an isometric view of a portion of a multi-part pipe having an outer synthetic sidewall and an inner rigid pipe supported thereby;

FIG. 7 is an isometric view of a pipe coupler for coupling the rigid pipe of the embodiment of FIG. 6;

FIG. 8 is a partial side sectional view of the engaging arrangement of the multi-part pipe of FIG. 6 with the frontal jacking assembly;

FIGS. 9 and 10 are respective side sectional and end views of an alternate embodiment of the cone expander according to the invention, with a conical element adapted for use where the old pipes are buried adjacent a rock bed or other nonmovable sidewall;

FIG. 11 is a side view of a jack according to another embodiment of the invention;

FIGS. 12a and 12b illustrate member with pairs of fins offset with respect to other pairs of fins; and FIG. 13 illustrate a frontal jacking assembly structure to allow liquid to flow from the old pipe to the new replacement pipes.

DETAILED DESCRIPTION OF THE INVENTION

Figure 1:
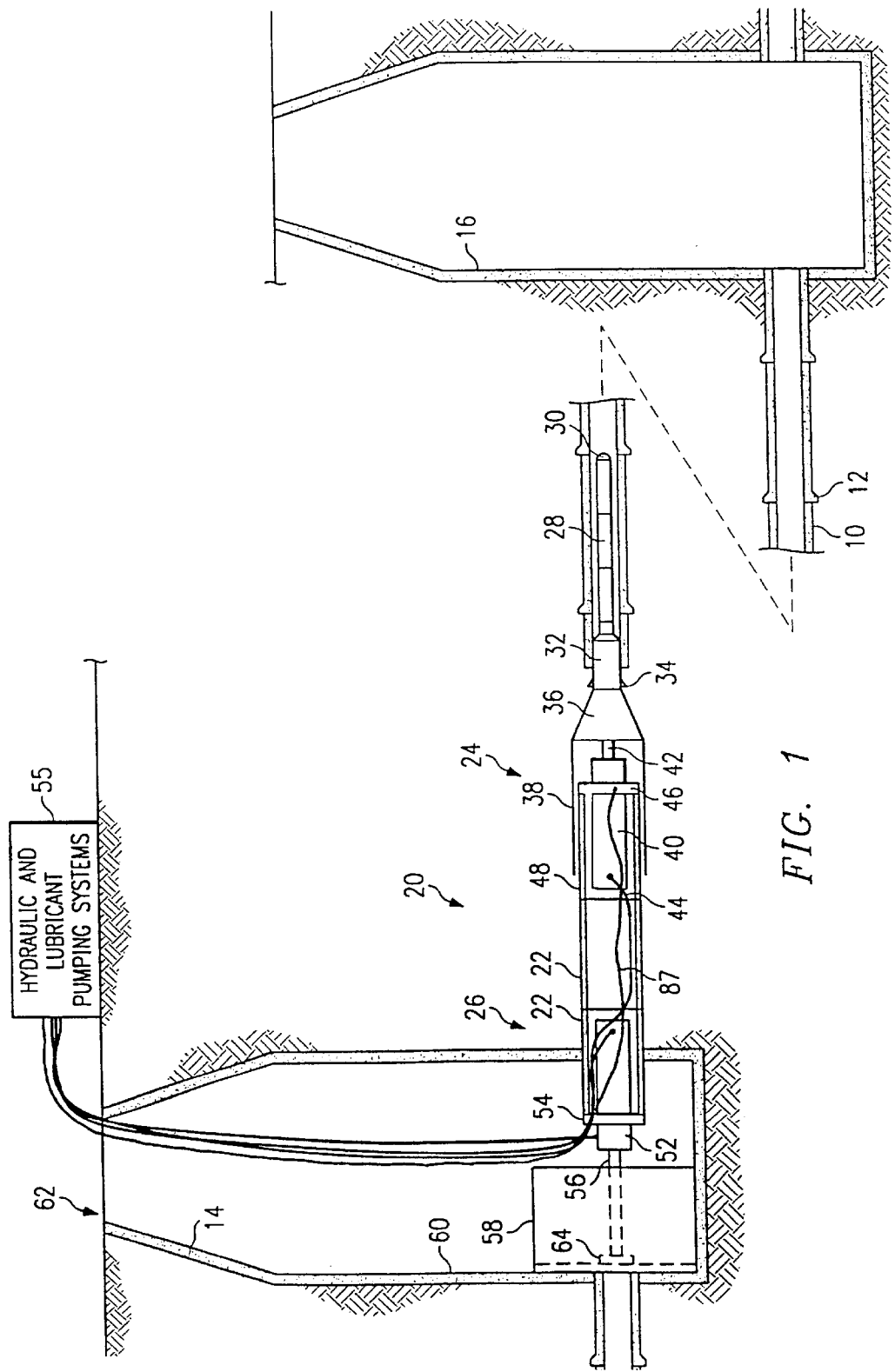
FIG. 1 is a side plan view of the pipe replacement apparatus according to one embodiment of the invention, as utilized for replacing old underground pipes that extend between manholes.

FIG. 1 illustrates preferred embodiment of the invention operating to replace underground sewer pipes that may be constructed of clay, plastic, concrete or other material that can be broken. As will be apparent from the following description, the invention may find a wide variety of applications for replacing other than sewer pipes. A conventional underground piping system may utilize plural sections of old pipe 10 joined together at coupling joints 12, and extending between manholes 14 and 16 or other type of access vaults. The invention is particularly advantageous for replacing old underground pipes 10 which may be broken or leaking, or simply to replace such pipes due to age and before leaking occurs.

The pipe replacement system 20 according to the preferred embodiment of the invention is shown replacing the old pipe sections 10 with larger diameter new pipe sections 22. While the replacement with new, larger pipe sections is described herein, the invention is equally applicable for the replacement of the same size or even smaller size pipes. As shown in FIG. 1, the new pipe sections 22 are preferably a high quality, clay type structure having no exterior ribs or other discontinuities which would otherwise increase the resistance in pushing such pipe sections 22 through the soil. The clay pipe contemplated for use by the invention is identified as type "No Dig", obtainable from Mission Clay Products, Pittsburgh, Kansas. Alternatively, ductile steel pipe can also be utilized with equal effectiveness. Ductile pipe sections acceptable for use with the invention can be obtained from American Cast Iron Pipe Company, located at Birmingham, Ala. Ductile pipe sections suitable for use are identified as Model MT Push Pipe, having mateable joints sealable with an O-ring type seal. As can be appreciated, the sections of old pipe 10 are broken up and moved out of the path of the new pipe sections.

The pipe replacement system 20 of the invention includes a frontal jacking assembly 24 and a rear jacking assembly 26. The frontal jacking assembly 24 can include an elongate snout 28 which may have plural sections, where the frontal section thereof has a blunt or rounded end 30. The snout 28 is preferably a single section of about two feet long. The snout 28 functions to seek and maintain a routing path of the frontal jacking assembly 24 through the path of the old pipe 10. With this arrangement, the new pipe 22 is pushed in essentially the same path as was the old pipe 10. Connected to the rearmost section of the snout 28 is a finned, cylindrical member 32 that has a diameter somewhat less than the inside diameter of the old pipe sections 10. The finned member 32 is preferably about two feet long and can be constructed with steel tubing shaped from a larger diameter section to a smaller diameter section. Welded or otherwise fastened to the finned member 32 are plural fins 34 that extend radially outwardly from the body of the finned member 32. The fins 34 extend outward from the body of the member 32 about ½–2 inches, and function to fracture or crack the old pipe sections 10 when forced therethrough.

Joined to the back of the finned member 32 is a cone expander 36. The cone expander is a rigid conical member constructed of heavy gauge steel, and formed so as to have a frontal diameter about the same as that of the finned member 32, and with a rear diameter being somewhat larger than that of the diameter of the new pipe sections 22.

Suitably joined at the back of the cone expander 36 is an elongate cylindrical sleeve 38 that operates telescopically with respect to a frontal jack 40. The frontal jack 40 is preferably of the hydraulic type having a plunger 42 that can be extended when a hydraulic fluid is forced into an inlet hose 44. A double-action hydraulic jack is preferable for use with the frontal jacking assembly 24, although a single-action type is necessary. The hydraulic fluid utilized to operate the frontal jack 40 can be of the type suitable for underground operations and of the noncontaminating type in the event a hydraulic leak occurs. When the frontal jack 40 is operated to extend the plunger 42, the apparatus connected thereto is pushed forwardly to define a route of the new pipe, to fracture the old pipe sections 10, to expand the old path and form a new path for the pipe to be pushed therein. The apparatus preferably functioning to carry this out is the snout 28, the finned member 32 and the cone expander 36 with the attached sleeve 38. The sleeve 38 is preferably about three feet long, thereby providing a frontal assembly about 7½ feet long. When a substantial force is exerted on the frontal assembly, the path of the old-pipe is followed and even straightened, due to the elongate nature of the apparatus being pushed therethrough. Due to the significant pushing forces being exerted on the frontal assembly by either of the jacks 52 or 40, and the flat vertical engagement surfaces between the components, the assembly resists any forces tending to divert it from a straight path. The same advantages cannot be realized if the frontal assembly were to be pulled through the old pipe, such as by a cable attached to the snout 28. As noted in FIG. 1, the cone expander 36 is coupled intermediate the elongate finned member 32 and/or the snout 28, and the elongate sleeve 38. The forward longitudinal pushing force exerted on the rearmost component in the train of components is preferably greater than any radial force exerted by the ground on the component train, whereby the ground surrounding the component train yields to effectively straighten the path. It is significant to also note that each section of the frontal apparatus is removable from the other sections so that the components of the entire unit can be lowered within a manhole and assembled together.

In one embodiment, the frontal jack 40 is welded to an annular collar 46 which, in turn, is loosely fastened to a cylindrical coupling shell 48 that telescopes within the cylindrical sleeve 38. In this embodiment, the back edge of the coupling shell 48 is constructed to mate with the front edge of the new clay tile pipe 22. To that end, the back edge of the coupling shell 48 is essentially the same configuration as that of the rear edge of a clay tile 22 to provide a mating fit therebetween. It is important to note that the telescopic movement of the sleeve 38 with respect to the coupling shell 48 prevents dirt and other debris from falling into the apparatus when the cone expander 36 is pushed forward, and when the pipe sections 22 and the frontal jack 40 are pushed forwardly by the rear jacking assembly 26.

FIG. 4a shows one technique utilized in connecting the frontal jack 40 to the coupling shell 48. The coupling shell 48 has a front end wall 49 that has a central opening through which the jack 40 protrudes. The collar 46 is loosely connected to the end wall 49 of the coupling shell by about three bolts that are threaded into the coupling shell end wall 49, but not completely tightened. This loose fit allows a certain degree of axial misalignment between the parts. However, when the coupling shell 48 is pushed forward by the rear jack 52, the coupling shell end wall 49 abuts against the collar 46, thereby forcing the frontal jack 40 forward. It is contemplated that a yieldable spacer, such as a plywood plate, can be installed between the coupling shell end plate 49 and the frontal jack collar 46.

The rear jacking assembly 26 includes a rear jack 52 that is of the double-acting type, and with an annular collar or adapter 54 welded thereto. The rear jack 52 is shown in FIG. 1 partially inserted into a new pipe section 22 with the collar 54 engaging the back edge of the rear-most pipe section. The collar 54 is constructed so as to mate with the back edge of the new pipe sections 22. In this manner, when the collar 54 is forced in a forwardly direction, the rearmost pipe section 22 is also pushed forward, thereby pushing forward all the other pipe sections joined in front of it, as well as pushing the frontal jacking assembly 24. The collar 54 welded around the rear jack 52 has holes or slots formed therethrough (not shown) for feeding therethrough various hydraulic lines for operating both the rear jack 52 and the frontal jack 40.

To be described in more detail below, one or more lines carrying a lubricant, such as bentonite, can also be extended through both the collar 54 and the new pipe sections 22 to the frontal jacking assembly 24 for allowing the lubricant to be injected outside of the new pipe and outside the cone expander 36. The lubricant reduces the force required to push the frontal jacking assembly 24 in a forward direction. Equipment 55 located at the surface can be manually operated to operate the hydraulic jacks 40 and 52, as well as the lubricating mechanism. The equipment 55 includes one or more hydraulic pumps and pressure gauges for monitoring the hydraulic pressure produced by the pumps. By monitoring the hydraulic pressure coupled to the jacks 40 and 52, the progress of the jacking technique can be determined. For example, the hydraulic pressure of the rear jack 52 can be monitored, and when it rises significantly, this may be an indication that the frontal apparatus 24, and especially the cone expander 36, has encountered a rock or the like, repair coupler, or a clamp around the old pipe 10. With an abnormal rise in the hydraulic pressure of the rear jack 52, its activation can be interrupted and the frontal jack 40 can then be activated to break the old pipe in addition to the repair coupler.

The rear jack 52 includes a plunger 56 having an end that works against a large area steel plate 58 that is curved in such a manner as to fully conform and engage a portion of the sidewall 60 of the manhole 14. The steel plate 58 is of such a size that it can be inserted into the opening 62 of the manhole and made engageable against the manhole wall 60. Welded to the end of the cylinder 56 is a metal plate 64 for providing engagement between the plate 58 and the hydraulic plunger 56.

The details of the rear jacking assembly 26 and the pump apparatus 55 are shown more clearly in FIG. 2. Hydraulic hose 70 is effective to provide hydraulic pressure to the frontal jack 40 for extending the plunger 42. Hydraulic hoses 72 and 74 provide hydraulic pressure for respectively expanding and contracting the plunger 56 of the rear jack 52. The rear jack 52 is preferably of the type which can exert the necessary force to push the new pipe sections 22 through the path formed by the frontal jacking assembly 24. The frontal jack 40 is of the type which can produce the necessary force for fracturing the old pipe sections 10 and expanding the same to define a bore for the new pipe sections. As can be appreciated, the force applied to the rearmost new pipe section is applied to the back edge thereof via the collar 54 of the rear jack 52. The joint of each new pipe section 22 therefore must transfer the force to the pipe section ahead of it, all without breaking or otherwise damaging the joints of the new pipe sections. Importantly, the joints of the new pipe sections are constructed so as to provide a seal therebetween and accommodate an annular washer between the pipe sections to transfer a uniform force around an annular edge of one pipe to the next pipe. Preferably the annular flat washer is fabricated of plywood or other hard rubber material to transfer the jacking force between the pipe sections, without any actual clay material contact therebetween which might not be able to handle the jacking force required. The hard deformable washer eliminates point loading between the clay tile sections and possible cracking that may result therefrom. The plywood washer does not constitute the fluid seal between the pipe sections. Rather, a rubber seal that engages one section with the other provides the seal between the pipe sections. The clay tile identified above has a pipe joint of such construction.

The pumping equipment 55 preferably located at the surface of the operation includes a hydraulic pump 53 operated by a manual lever 61 to force high pressure hydraulic fluid from a reservoir 57 to the hydraulic lines 72 and 74 via valve 63, and to hydraulic hose 70 via valve 67. The general direction of the hydraulic fluid flow is shown by the arrows. Hydraulic pumps capable of developing hydraulic pressures of about 3000 to 5000 psi are conventionally available. A pressure gauge 59 provides an indication of the pressure of the hydraulic liquid that actuates the frontal jack 40 via hose 70, and pressure gauge 65 indicates the pressure of the hydraulic liquid that causes extension of the plunger 56 of the rear jack 52 via hose 72. The hydraulic valve 63 is of the type that has three positions, one position for allowing the hydraulic fluid to be pumped through hose 72, another position for allowing hydraulic fluid to be pumped through hose 74, and a third "off" position which allows hydraulic fluid a return flow path to the reservoir 57, via the other valve 67. The valve 67 has an "off" position for allowing hydraulic fluid to complete a return path from valve 63 to the reservoir 57. In the off position, the valve 67 can also allow hydraulic fluid to flow in a reverse direction through hose 70 to the return line, such as when the rear jack 52 is being activated to extend its plunger 56 and cause retraction of the plunger 42 within the frontal jack 40. In a second position, the valve 67 allows hydraulic fluid to be pumped into hose 70 and cause the plunger 42 of the frontal jack 40 to extend. Those skilled in the art can readily devise of other valving arrangements and equipment to accomplish the technique described herein.

In order to reduce the force necessary to push the new pipe sections 22 in the path of the old broken pipeline, a lubricant and pump are provided to dispense a lubricating fluid around the new pipe sections 22. A lubricant pump 69 and a reservoir 71 of a lubricant, preferably bentonite, are also located near the other pump apparatus 55 so that the operator can force the lubricant into the path, via hose 87, when the friction between the new pipe sections 22 and the bore becomes significantly great. As will be described in more detail below, when the hydraulic pressure of the rear jack 52 shows a significant increase in pressure, as noted on gauge 65, the movement of the new pipe sections 22 can be facilitated by activating the pump 69 to force the lubricant between the outside of new pipe sections and the burrow or bore formed by the cone expander 36.

With reference now to FIG. 3a, there is shown the frontal jacking assembly 25 according to another embodiment. The internal coupling apparatus is shown connecting the various components of the frontal jacking assembly 25 together. The coupling mechanism for each component of the frontal jacking assembly 25 comprises a hexagonal-shaped stub that is insertable into a corresponding hexagonal-shaped female member of each of the components. One hexagonal stub 80 is shown, for example, coupling the cone expander 36 to the finned member 32. The components can be pinned to the hexagonal stub 80 during assembly in the manhole 14 to thereby fix the components together and to prevent inadvertent coupling. This interconnecting arrangement provides a highly versatile construction that allows, for example, sections to be added to the snout 28 to achieve any desired length. Advantageously, different diameter finned members 32 can be connected to the snout 28 to accommodate the replacement of different size sections 10 of old pipe. In a similar manner, different shapes and sizes of cone expanders can be connected to the finned member 32. Also, there may be situations where the finned member 32 is not required at all, whereby the hexagonal coupling sections allow the cone expander 36 to be connected directly to the snout 28.

Further shown in detail in FIG. 4b is the coupling arrangement between the plunger 43 of the frontal jack 41 and the cone expander 36. The large diameter end of the cone expander 36 has an end wall 82 formed of a thick steel plate that is welded to the cone-shaped sidewall. Formed in the center of the end wall 82 is hexagonal-shaped female member 83 for receiving a hexagonal-shaped coupling stub 84 that is fastened, such as by welding, to a circular plate 86. Bolted to the end of the jacking plunger 43 is the plate 86 to provide a surface area for engagement with the back wall 82 of the cone expander 36, via the frontal end wall of the sleeve 38. The sleeve end wall has a hole therein for the passage therethrough of the hex stub 84. With this arrangement, when the plunger 43 is extended forwardly, the plate 86 pushes against the front end wall of the sleeve 38 and the expander back wall 82, thereby forcing the cone expander 36 in a forward direction. In FIG. 4b it is noted that the large diameter hydraulic plunger 43 can provide additional force, given a predefined pressure applied thereto. Also, because a substantial vertical surface area exists between the engaging end walls 38 and 82 of the sleeve 38 and the cone expander 36, and in view of the longitudinal forces exerted thereon by the jacks, such components in the train of the frontal assembly are maintained axially aligned, despite forces on the surrounding burrow to divert the assembly.

An advantage with the coupling arrangement of the components of the invention is that additional components can be interposed in the train of components. For example, an additional conical section can be coupled to the back of the cone expander 36 to extend the conical sidewall and achieve a larger diameter expander, thereby allowing a larger diameter pipe section to replace the old pipes 10. Other components can be interposed in the component train in a similar manner.

Figure 3B:
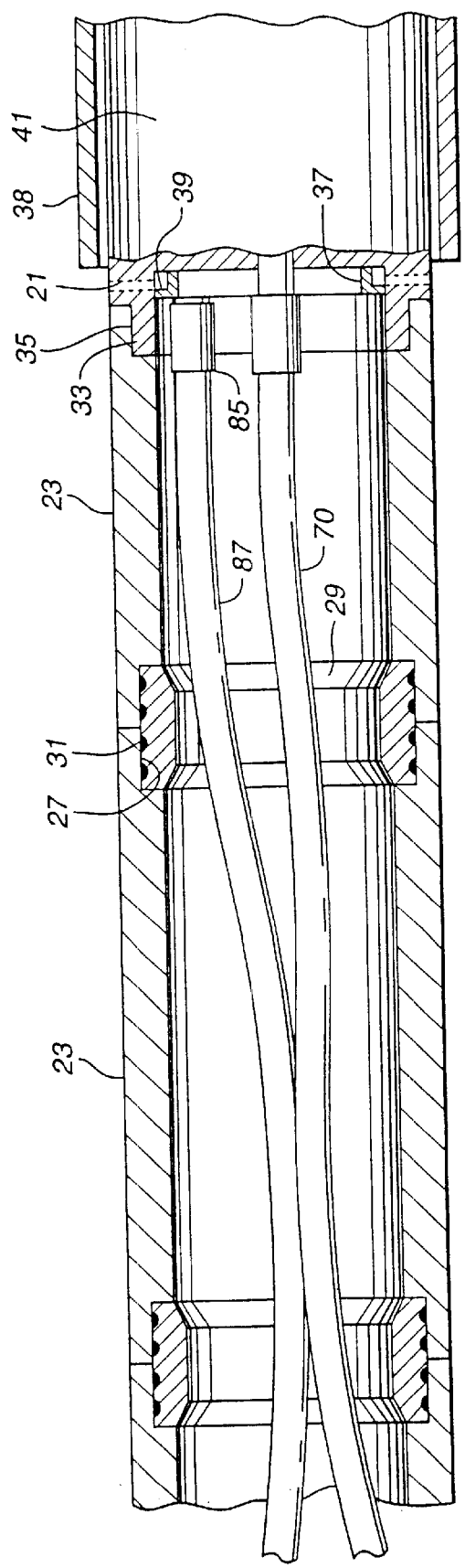
FIG. 3b illustrates the structural features of the frontal jack for mating directly to ductile steel pipe sections.

It is also to be noted that the embodiment of FIG. 3a illustrates sections of ductile iron pipe 23 mated directly to the back of the frontal jack 41. The back surface of the frontal jack 41 is complementary shaped to mate with the shaped edge of the new iron pipe sections 23. The details of the ductile iron pipe 23 and the frontal jack 41 are shown in FIG. 3b. The iron pipe sections 23 include internal annular recessed areas 27 at each end thereof. A circular heavy duty metal band 29 includes annular grooves therearound for holding four O-ring seals 31. A substantial force is required to mate the pipe sections 23 together in a sealed relationship, as well as to separate the sections. The back of the frontal jack 41 includes an annular ring 33 having an external annular recessed area 35 for mating with the complementary edge of the foremost iron pipe section 23. A silicone sealant can be applied to the external recess 35 to seal the frontal edge of the iron pipe 23 thereto. By the use of a silicone sealant, the frontal jack is easily removed from the steel pipe.

An internal annular lubricant dispensing ring 37 is bolted, welded or otherwise fixed to the back surface of the frontal jack 41. The ring 37 has an internal annular bore 39 in communication with the lubricant hose 87 via a quick disconnect fitting 85. The internal bore 39 is, in turn, in communication with a number of spaced-apart lubricant ports 21 formed in the sidewall of the hydraulic jack cylinder. In this manner, when a lubricant is pumped into the hose 87, it is uniformly distributed out of each port 21 by way of the annular bore 39. The forward movement of the ductile iron pipe 23 causes a distribution of the lubricant therearound to reduce the skin friction.

FIGS. 5a and 5b illustrate a technique for dispensing a lubricant at the leading portion of a cone expander 170 to provide a lubricant around clay tile pipe 22. According to this technique, the clay tile pipe 22 is mated directly to the back of a coupling shell 172 to which the frontal jack 40 is attached at the front thereof, such as by bolts (not shown). The hydraulic hose 70 is coupled via a quick disconnect fitting to the back of the jack 40, via a back plate 174 of the coupling shell 172. The plunger 42 of the jack 40 engages the cone expander 170 in a similar manner as shown in FIG. 4b. The coupling shell 172 is housed within an elongate sleeve 175, and moves telescopically therein.

The clay tile pipe 22 abuts against the back plate 174 of the coupling shell 172 via a cushioning washer (not shown). A stainless steel band 176 encircles a recessed portion in both the back plate 174 and the clay tile pipe 22. A pair of elastomeric seals (not shown) can be utilized between the band 176 and the abutted parts to seal the clay tile pipe 22 to the coupling shell 172.

A quick disconnect fitting 85 provides a connection between the lubricant hose 87 and a flexible cane-shaped hose 178, via the back plate 174. The short section of lubricant hose 178 is disposed outside the frontal jack 40, and is of sufficient length to accommodate the reciprocating movement between the coupling shell 172 and the cone expander 170. The short hose 178 is coupled via a fitting to a rigid conduit 180 which passes through a hole (not shown) in the front of the coupling shell 172. The rigid conduit 180 is anchored to the back wall of the cone expander, but passes therethrough to the front end of the cone expander 170, as shown in broken lines.

The rigid conduit 180 is fastened to the front planar face 182 of the cone expander 170, as shown in FIG. 5b. An annular groove 184 is in communication with the open end of the rigid conduit 180. Further, a number of radial grooves 186 are in communication with the annular groove 184. It can thus be seen that as a lubricant is pumped into the long hose 87, it is forced through the short flexible hose 178, the rigid conduit 180, the annular groove 184 and out the radial grooves 186. The annular and radial grooves are enclosed by the engagement of the back planar surface of the finned member 32 against the planar face 182 of the cone expander 170. Those skilled in the art may also employ a similar distribution system and ports in the back plate 174 of the coupling shell 172 to provide a distribution of the lubricant directly in front of the foremost pipe 22.

Figure 5C:
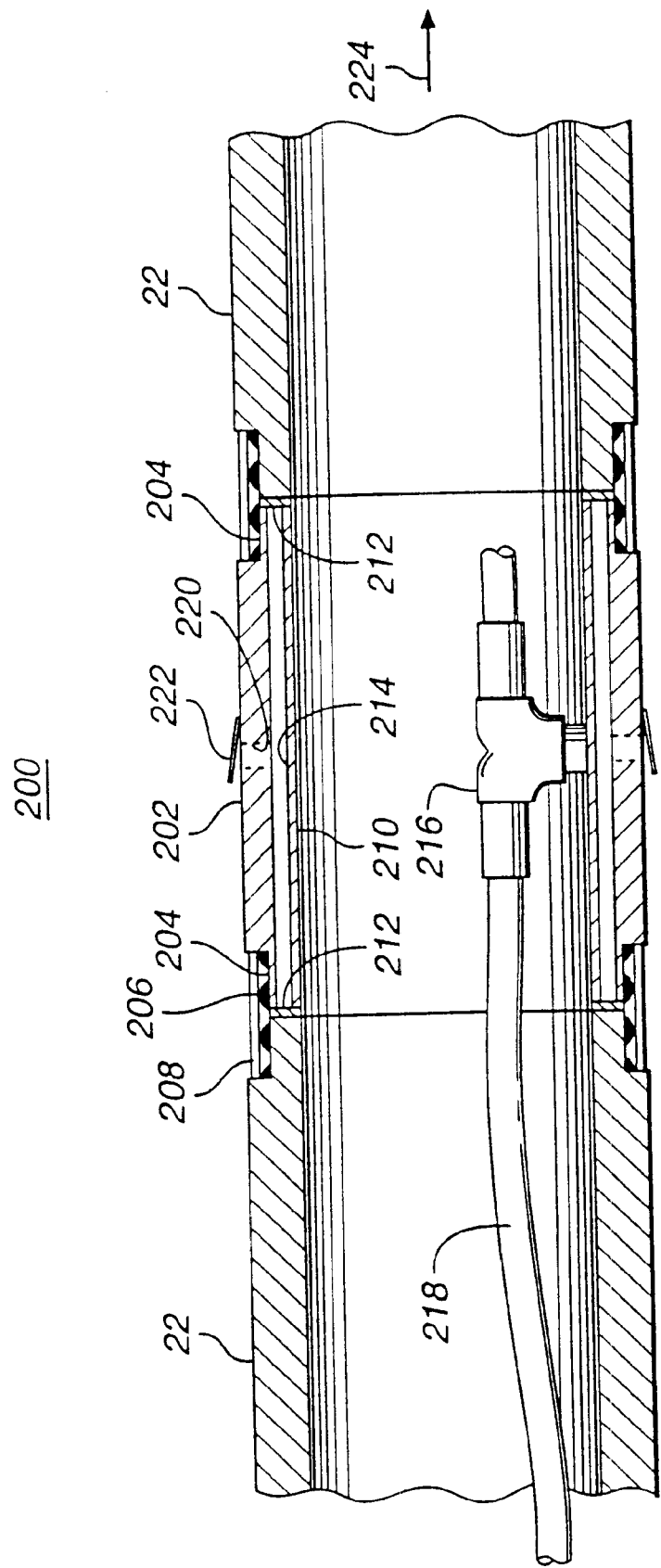
FIG. 5c is a sectional view of an intermediate lubricator disposed between new pipe sections for lubricating the burrow during advancement of the new pipe sections.

FIG. 5c is a sectional view of an intermediate lubricator 200 disposed between two new pipe sections 22. Although the intermediate lubricator 200 is shown placed between clay tile sections 22, such a lubricator 200 can also be constructed with edge configurations so as to be mateable with ductile iron pipe sections 23 as well as other types and configurations of pipes. The intermediate lubricator 200 is constructed of a heavy wall steel pipe 202 of the same general outside diameter as the new pipe sections 22, and having a sidewall strength sufficient to withstand the pushing force exerted by the back jack 52. The front and back edge of the pipe 202 has machined therein outer annular recesses 204, substantially identical to the corresponding recesses of the new pipe sections 22 to be mated thereto. A number of elastomeric, triangular-shaped seals 206 are inserted over the recesses 204. A stainless steel band 208 is placed over the seals 206 as one pipe 22 is pushed against the intermediate lubricator 200, thereby squeezing and radially compressing the seals to form a liquid seal between the components. While not shown, plywood rings can be utilized between the abutting edges of the clay tile sections 22 and those of the intermediate lubricator 200. This reduces point loading and breakage of the clay tile pipe 22.

The steel lubricator pipe 202 need not be as long as a new pipe section 22, but preferably is about two feet long. Welded internal to the heavy duty steel pipe section 202 and spaced apart therefrom is a thin wall sleeve 210. A pair of spacers 212 between the internal surface of the heavy duty pipe 202 and the edges of the sleeve 210 maintain the spaced apart relationship of the cylindrical members to thereby form an internal annular chamber 214. An elbow or T-type connection 216 is fastened to the internal sleeve 210 so that a lubricant can be pumped, via a hose 218 and quick disconnect fitting, into the annular chamber 214. A T-type connection can be utilized to extend the hose 218 to lubricating apparatus associated with the frontal apparatus. A number of ports 220 are drilled through the thick sidewall of the heavy duty pipe 202 so that the lubricant is dispensed outside the intermediate lubricator 200 to thereby reduce the skin friction between the new pipe sections 22 and the burrow formed by the cone expander 36. The holes or ports 220 can vary in number and location around the heavy duty pipe 220. In order to prevent dirt, rocks and particles from clogging the ports 220, each port is covered with an eyelid sheet metal piece 222. Each eyelid 222 is welded or otherwise fastened to the outer sidewall of the heavy duty pipe 202, ahead of the port 220. In this manner, the eyelid 222 prevents dirt from 10 plugging the port 220, but the lubricant can nevertheless be pumped out of the port 220 by causing the eyelid 222 to flex outwardly. The direction of movement of the new pipe sections 22 is shown by arrow 224.

While the intermediate lubricator 200 is preferably utilized between new pipe sections, it can also be coupled directly behind the frontal jack 40 to provide frontal lubricating capabilities. In other words, the frontal jacking assembly need not be constructed to include internal lubricating apparatus, but need only be coupled in front of the intermediate lubricator 200. Indeed, expensive frontal jacking units need not be modified to accommodate lubricating apparatus, but need only have the intermediate lubricator coupled between the foremost new pipe section and the frontal jack 40.

The apparatus according to the various disclosed embodiments operates in the following manner. The opening in the sidewall of the manhole 14 associated with the old pipeline may need to be enlarged with a jack hammer, or the like. The components of the frontal jacking assembly 24 are lowered into the manhole 14 via the opening 62. The components are assembled together using the hexagonal joints described above. The snout 28 is inserted through the manhole wall into the old pipe sections 10 with the finned member 32 and the cone expander 36 connected thereto, the latter component being suspended in the manhole 14 as needed. Next, the frontal jack 40 and the coupling shell 48 are slid into the sleeve 38 and lowered into the manhole as an assembly. Hydraulic hoses are connected to the frontal cylinder 40 so as to operate it in a double-acting manner. The arcuate steel plate 58 is then lowered into the manhole and engaged against the back wall 60 of the manhole 14. A number of spacer blocks (not shown) can be positioned behind the frontal jack 40 and the plate 58 so that it can be operated to force the plunger 42 forwardly, thereby also moving the cone expander 36, the finned member 32 and the snout 28 into the sections of the old pipe 10. Depending upon the reach of the plunger 42 a number of extensions may be required, together with additional spacer blocks, to fully push the cone expander 36 and sleeve 38 outwardly beyond the sidewall of the manhole 14. In carrying out this operation, several sections of the old pipe 10 will be broken up and the cone expander 36 and sleeve 38 will have provided a short burrow in the path of the old pipes 10. After the frontal jacking assembly 24 has been fully pushed beyond the vertical sidewall of the manhole 14, one hydraulic hose. The frontal jack 40 can then be operated in a single-action manner for forcefully extending the plunger 42 with respect to the cylinder portion of the jack.

Continuing with the jacking operation, the rear jack 52 can be inserted into a new pipe section 22 at the surface, can be lowered into the manhole 14. Then, the hydraulic hose 70 of the frontal jack 40 is threaded through the new pipe sections 22, through a hole or slot in the collar 54 of rear jack 52, and all the hydraulic lines, and lubrication hoses if utilized, are connected to the surface operating equipment 55. It should be noted that because of the small diameter of the manhole 14, e.g., about four feet, the plunger 56 of the rear jack 52 is initially in a retracted position when lowered into the manhole 14. After the rear jacking assembly 26 and the first new pipe section 22 are assembled and lowered into the manhole, the frontal edge of the new pipe section is engaged with the rear edge of the coupling shell 48 of the frontal jacking assembly 24. When configured in this manner, the surface operating equipment 55 is activated to forcefully extend the plunger 56 of the rear jack 52, thereby pushing the body of the rear jack 52 forward, and therewith pushing the new pipe section 22 as well as the frontal jacking assembly 24. The lubricant pump 69 can also be activated to lubricate any intermediate lubricators and/or the frontal jacking assembly 24 when desired.

As an alternative to the manual handling of the rear jack 52, a jacking frame attached to the rear jack 52 can be utilized in a pit, along with the equipment 55 mounted thereto, for controlling the pipe replacement operation. While the jacking frame is not a part of the present invention, those skilled in the art can readily devise such equipment, in view of the prior art cited in connection with U.S. Pat. No. 5,482,404.

It should be noted that depending upon the type of soil, the type of old pipe 10 and the ease with which it can be destroyed, the frontal jack 40 may not have to be operated. Rather, the force provided by the rear jack 52 may be sufficient itself to move the new pipe sections 22 forward as well as break up the old pipe 10 with the cone expander 36. In this mode of operation, the plunger 42 of the frontal jack 40 will continue to be in a retracted position and thus is not utilized. As the new pipe section 22 is fully pushed beyond the sidewall of the manhole 14, the plunger 56 of the rear jack 52 is retracted, whereupon the jack 52 is raised to the surface and reinserted into another section of the new pipe 22. The foregoing steps continue to be carried out to push the frontal jacking assembly 24 forwardly and break up the old tile 10 as well as force the new pipe sections 22 in the path or burrow formed by the cone expander 36 and sleeve 38.

In the event that the hydraulic force required to push the entire new pipeline 22 and frontal jacking assembly 24 exceeds a predefined amount, as indicated on the pressure gauge 65, due to the type of soil or the type of old pipe 10, the operation of the frontal jack 40 may be required. During this alternate mode of operation, the plunger 56 of the rear jack 52 is extended and remains in an extended position to hold the new pipe sections 22 stationary. Then, the valve 67 and pump 53 are operated to independently cause the plunger 42 of the frontal jack 40 to be extended. The extension of the frontal jack 40 causes the snout 28, the finned member 32 and the cone expander 36 and sleeve 38 to be pushed forwardly to thereby break up the sections of old pipe 10. With this operation, no force at this time is required to move the new sections of pipe 22, but only to fracture and break the old pipe sections 10 and to expand the soil by the action of the cone expander 36. Because the frontal jack 40 is configured only as a single action cylinder, the subsequent operation of the rear jack 52 in pushing and advancing a new section of pipe 22 into the burrow, is effective to retract the sleeve 38 over the coupling shell 48 and the retract plunger 42 into the frontal jack 40 as they are pushed toward the cone expander 36. Rather than moving the cone expander 36 forwardly, this forward movement of the new pipe sections 22 and the frontal jack 40 only results in the retraction of the frontal jack plunger 42. Thus, it can be seen that in this latter alternating operation between the rear jack 52 and the frontal jack 40, the rear jack 52 is effective to push new pipe sections into the burrow, and the frontal jack 40 is effective to break the old pipe 10 and provide an expanded burrow. Those skilled in the art may find that while the alternate operation of the jacks 40 and 52 provide the results noted above, there may be other advantages in utilizing other valve arrangements and operating both jacks simultaneously.

Once the snout 28 begins to protrude through the end of the old pipe section 10 and into the destination manhole 16, the frontal jacking assembly 24 can be disassembled. In the disassembly, the sections of the snout 28 can be uncoupled as they appear in the destination manhole. The uncoupling of the finned member 32 and the expander cone 36 and sleeve 38 can also be accomplished by virtue of the male and female hexagonal couplers 80. Lastly, the frontal jack 40 can S be removed and decoupled from the hydraulic and lubricant lines for removal thereof. The sidewall of the destination manhole 16 will have to be enlarged with a jackhammer before the frontal jacking assembly begins to protrude into the manhole 16.

In addition to the foregoing technique, the advancement of the new pipe sections can be coordinated with the pumping of the lubricant to facilitate movement of the new pipes. The force required to push both the new pipe sections 22, the cone expander 36 and the finned member 32 is that which is necessary to overcome the numerous frictional forces. The major frictional forces are the skin friction of the new pipe sections 22 as they are forced through the burrow, the penetration friction forces incurred by the finned member 32 in cracking the old pipe, and the forces involved in forcing the broken pipe pieces into the soil and forcing the surrounding soil radially outwardly to form a burrow of sufficient diameter to accommodate the new pipe sections 22. Many of these frictional forces can be reduced, especially the skin friction, by the utilization of the lubricant pump 69 and the lubricant distribution system. It can be appreciated that the skin friction increases in correspondence with the total length of the new pipe pushed into the burrow.

According to a feature of the invention, the skin friction forces can be determined independently of the frictional forces incurred by the cone expander 36 and the finned member 32. When the frontal jack 40 is not activated, all the frictional forces must be overcome by the force generated solely by the rear jack 52. When the frontal jack 40 and the rear jack 52 are operated alternatively, only the rear jack 52 must overcome the skin friction to move the new pipe sections forwardly, and the frontal jack 40 must overcome the penetration frictional forces in moving the cone expander 36 forward and breaking the old pipe. When independently activating the frontal jack 40, the pressure is noted on the gauge 59. If the pressure is much lower than the pressure noted on the gauge 65 (when the rear jack 52 is operated), then it can be concluded that the major portion of the frictional forces is a result of skin friction. In such event, this is an indication that the lubricant pump 69 should be activated to force the lubricant to intermediate lubricators and into the sleeve chamber and out into the annular space outside the coupling shell 48. If the skin friction is minimal, as compared to the penetration frictional forces on the cone expander 36 and the finned member 34, then only the rear jack 52 need be employed to advance both the new pipe sections and the frontal apparatus forwardly.

The frictional forces of the frontal apparatus can optionally be determined without the use of a pressure gauge 59 for monitoring the pressure that drives the front jack 40. With the plunger 42 of the front jack 40 completely retracted, the back jack 52 is activated to push both the new pipe sections 22 and the cone expander 36 forwardly to thereby crack the old pipe, expand the broken pipe outwardly and push the new pipe 22 in the burrow. The hydraulic pressure required to force all this equipment forward is noted on gauge 65. Then, only the frontal jack 40 is activated to push the frontal apparatus forward, without advancing the new pipe sections 22. No hydraulic pressure is monitored at this intermediate stage. Lastly, only the rear jack 52 is activated to move only the new pipe sections 22 forwardly without advancing the frontal apparatus forwardly. The hydraulic pressure is noted on gauge 65 in this latter step. The second hydraulic pressure required to move only the new pipe sections 22 is subtracted from the first hydraulic pressure required to move all the equipment, thereby leaving the result as an indication of the penetration friction associated with the movement of the frontal apparatus.

FIG. 6 illustrates a multi-part pipe structure that can be advantageously utilized in accordance with the invention. The pipe structure 100 includes an outer synthetic pipe 102 suitable for joining together at a joint 104 that is sealed by a rubber seal (not shown) or otherwise, to carry sewage or other liquids. Supported within the synthetic pipe 102 is a steel pipe 106 that can be coupled together by a coupler 108. The coupler 108 is shown in more detail in FIG. 7. The coupler includes a small pipe section 110 that can be inserted into the ends of the pipe sections 106 to be joined to maintain such pipes axially aligned. An annular plate 112 prevents axial movement of the coupler 108 within the steel pipes 106 during jacking of the multi-part pipe 100. The steel pipes 106 are supported within the outer synthetic pipe 102 by plural spacers 114. The spacers 114 extend radially outwardly from the steel pipes 106, much like a spoke to maintain a central spacing of the pipe 106 within the outer synthetic pipe 102. The spacers 114 can be suitably fastened to the steel pipe 106 by forming thereon threaded studs for securing into threaded holes formed within the steel pipe 106. While four supports 114 are shown at spaced-part locations on the steel pipe 106, those skilled in the art may find that different numbers of spokes can be advantageously utilized. Also, there is shown one steel pipe 106 supported within a single section of synthetic pipe 102, but such arrangement can be varied. According to the present invention, the synthetic pipes 102 can be constructed of plastic or fiberglass, and the steel pipes 106 can be of short sections suitable for use in replacing underground pipes from a small manhole 14.

In operation, a section of the multi-part pipe 100 can be lowered into the manhole and the rear jack 52 abutted against the end of the steel pipe 106. The steel pipe is preferably constructed of a material and a sidewall thickness to transfer the jacking forces therethrough and thus to push the multi-part pipe 100 through the burrow formed by the frontal jacking assembly 24. The synthetic outer pipe 102 is carried with the steel inner pipe 106 during the forward movement of the latter. While not shown, the frontal jacking assembly 24, and particularly the coupling shell 48 would be modified to have a back section as shown in FIG. 8. Here, a thick steel plate 116 would be welded in a recessed manner within the coupling shell 48. The inside diameter of the coupling shell 48 would be somewhat larger than the outside diameter of the synthetic outer pipe 102, so that the latter could fit into the former and maintain registry therebetween. The internal steel pipe 106 would abut against the plate 116 and transfer the pushing force from the sections of the steel pipe 106 to the coupling shell 48. The coupling shell 48 would otherwise be constructed as shown in FIG. 3. Because the coupling shell 48 extends over the outer synthetic pipe 102, as shown in FIG. 8, dirt, debris and broken particles of the old pipe are prevented from entering the apparatus when the entire train of apparatus, including the new pipe sections 100, are pushed through the old pipe sections. As can be appreciated, from the foregoing arrangement, the pushing force exerted by the rear jacking assembly 26 is not transferred via the synthetic outer pipe 102, but rather is transferred by way of the inner steel pipe 106. After the old pipe has been completely replaced with the multi-part pipe 100, the center steel pipe 106 can be removed, thereby leaving the synthetic outer pipe 102 for carrying liquids.

Another variation of the replacement of old pipes 10, is a technique for utilizing new pipe sections, such as small diameter clay tile, that cannot withstand a substantial jacking force. In this case, reusable temporary steel pipe sections suitably joined together can be jacked into the path or burrow much like the operation shown and described above. The steel pipe is preferably of a type that can withstand substantial jacking forces, and is preferably of a diameter larger than the replacement clay tile. After the sleeve-cone arrangement and the temporary pipe has been fully jacked into the old pipeline 10, the new clay tile is jacked in behind the temporary steel pipe, thereby pushing the steel pipe out the destination end. The temporary pipe functions to form a bore somewhat larger than the clay tile so that the clay tile can be jacked using less jacking force. The initial lubrication utilized during the jacking of the temporary pipe will also serve to reduce the jacking force for the clay tile. In this technique, those skilled in the art may find it advantageous to provide an interface plate between the first new clay tile section and the last temporary pipe section. The interface plate will maintain axial registry between the different pipelines and facilitate the following of the clay tile behind the temporary steel pipe section.

In yet another variation of the foregoing, the steel pipe can be jacked into the path of the old pipe, and thereafter smaller diameter carrier pipe can be run through the steel pipe, whereupon both the outside steel pipe and the inner carrier pipe remain in place. This technique is especially advantageous where regulations require an outer rigid steel pipe functioning as a jacket around the inner fluid carrying pipe. Sewer pipes that extend under highways and streets often require this type of arrangement.

In accordance with another embodiment of the invention, there is shown in FIGS. 9 and 10, an offset cone expander 130 that is adapted for use where the old underground pipe 10 is located adjacent an immovable wall, such as a bedrock bottom or rock vertical sidewall, or utilized in old pipes where the top portion has deteriorated due to condensed gases and acids. The cone expander 130 shown in FIG. 9 has a circular front end 132 of a diameter about the same size as that of the finned member 32. The cone expander 130 includes a larger diameter circular section at the back edge 134 to thereby expand the soil and old broken pipe pieces in an outward direction. However, an axis 136 of the small diameter frontal end 132 is displaced or offset with respect to the axis 138 of the large diameter rear end. While not shown, the frontal end 132 and the rear end 134 of the offset cone expander 130 are capped with large thick steel end plates that have formed therein the hexagonal female coupling arrangements, shown are reference character 140. The respective axes 136 and 138 of the front and rear parts of the offset cone expander 130 are aligned with the respective female coupling members 140.

In operation, the offset cone expander 130 can be coupled to the finned member 32 and therethrough to the snout 28 as shown in FIG. 9, in situations where the old pipe 10 is located on a bed of rock. When the frontal jacking assembly 24 outfitted with the offset cone expander 130 is forced through the old pipe section 10, the conical surface located on the top and side portions of the expander 130 will force the soil and broken pipe debris upwardly and outwardly, but will not force the material in a downward direction toward the rock floor of the old piping system. The advantage with utilizing the offset-cone expander 130 with an old pipeline adjacent an immovable sidewall or bottom, is that the path formed by the frontal jacking assembly 24 tends to be maintained aligned with the old pipe system, rather than being skewed because of the influence of the solid rock bed or sidewall near the old piping system. In the event that it is known that the old piping system is adjacent a solid sidewall, then the offset cone expander 130 can be turned sideways, as compared to that shown in FIGS. 9 and 10, with the conical sections disposed away from the solid sidewall. Those skilled in the art may find that other shapes or departures from the offset cone expander 130 shown in FIGS. 9 and 10 may be utilized to overcome difficulties or problems encountered in the texture or configuration of the earth adjacent the old pipe system.

In accordance with another embodiment of the invention, there is disclosed in FIG. 11*a* hydraulic jack 150 adapted for use with the invention, but which can be utilized without long term interruption of the flow of waste from the old pipe system 10 to the new pipe system 22. The jack 150 includes a conventional body 152 having an internal bore (not shown) and a seal 154 operable in the bore, in a conventional manner to allow hydraulic fluid to be pumped into one port 156 to advance the plunger 158 forwardly, or to be pumped in another port 160 to force the plunger 158 in an opposite direction. In the hydraulic jack 150 of FIG. 11, the plunger 158 includes an internal bore 162 therethrough for carrying the liquid from the old pipe 10 to the new pipe sections 22. Also, the plunger 158 of the hydraulic jack 150 extends all the way through the body 152, with seals (not shown) on each end of the body for sealing the ends of the plunger 158 thereto. With this arrangement, the hydraulic jack 150 does not block or otherwise present an impediment to the flow of liquid from the old system to the new system. When utilizing the hydraulic jack 150 of FIG. 11, the remainder of the system and the frontal jacking assembly 24 shown in FIG. 13 also requires a path 164 therethrough. To that end, the blunt end cap 30 of the snout 28 is either removed or provided with a bore therethrough, as are all the hexagonal coupling joints joining the components of the frontal assembly 24 together. In this manner, a fluid flow path is provided completely through the frontal assembly, from the old pipes 10 to the new pipe sections 22. Further, with this arrangement, the rear jack assembly 26 also requires a hydraulic jack 150 of the type shown in FIG. 11 for coupling the waste through the manhole 14 and to the old pipe section extending on the side thereof. Hence, if it is contemplated that a pipe replacement is required to be carried out over a long period of time, then the apparatus of FIG. 11 can be utilized and arranged as shown in FIG. 1 to provide a continuous fluid flow path of waste water during the periods of nonuse of which the customers would be informed, the continuous flow path would be interrupted when the rear jacking assembly 26 is removed and new pipe sections are added, as described above.

The flow-through jack 150 of FIG. 11 can also be advantageously utilized as an intermediate jack when jacking long runs of pipe. Because the skin friction of long runs of pipe can be substantial, the jacking of all the pipe sections at one time may be difficult or prohibited, as the rearmost pipe section may not be able to withstand the axial jacking force necessary to move all the pipe sections in a long string of such pipes. By utilizing one or more intermediate jacks between the frontal and rear jacks 40 and 52, the intermediate sections of new pipe can be moved forwardly in a manner independent of the other pipe sections. For example, there can be an intermediate jack installed between new pipe sections at distances equal to that between manholes, future service connections, or necessary lateral excavation locations. Each run of new pipe can be moved forward in an inch-worm manner so that the entire run of pipe does not need to be moved in unison by the rear jack 52. Of course, hydraulic hoses would be extended inside the new pipe sections 22 and connected to each of the intermediate jacks 150. Each intermediate jack can then be removed at the manhole or service connection. The new pipe sections can also be joined together and sealed at such locations if such need exists. The flow-through capability of the jack 150 allows the new pipe sections to carry water or fluid during the jacking operation.

In FIGS. 12a and 12b, there is illustrated another embodiment of the finned member 32. Here, the fins 170–176 are substantially identical in size and shape, but fixed to the tubular part at different locations. The vertical fins 170 and 172 are located at diametric opposite locations, i.e., 180° apart. The horizontal fins 174 and 176 are also located 180° apart, and 90° from the vertical fins 170 and 172. Moreover, the horizontal fins 174 and 176 are axially displaced with respect to the vertical fins 170 and 172. In the preferred form, the leading edge 178 of the horizontal fins are located back of the leading edge 180 of the vertical fins 170 and 172. The offset spacing between the horizontal and vertical fins may be about on-half the axial length of the fins, or even more.

The offset nature of the fins reduces the force necessary to initially fracture or crack the old pipe 10. In the embodiment shown in FIG. 12, only the vertical fins 170 and 172 initially engage the old pipe and start the fracturing process, whereas the two horizontal fins 174 and 176 engage the old pipe thereafter. While not shown, the frontal edges of the fins 170–176 can be sharpened to a cutting edge and/or hard surfaced to withstand the wear and tear in cracking different types of pipe material.

While the foregoing illustrates and discloses the preferred and other embodiments of the invention with reference to specific structures and techniques, it is to be understood that many changes in structure and operation may be made as a matter of choices without departing from the spirit and scope of the invention, as defined by the appended claims.

What is claimed is:

1. Apparatus for replacing an underground pipe using new pipes, the new pipes characterized by being rigid and adapted for withstanding jacking forces, comprising:

a jack for forcing the new rigid pipes into a path of the underground pipe for replacement thereof;

an expander positioned in front of the new rigid pipes so as to be pushed forwardly when the new rigid pipes are pushed forwardly by said jack, said expander constructed with a heavy duty material without using cutters mounted thereto for rotation about respective axes generally aligned with an axis of the underground pipe, and said expander shaped for forcing the underground pipe radially outwardly to break the underground pipe and form a bore for movement therein of the new rigid pipes when said expander and new rigid pipes are pushed forwardly; and the new rigid pipes and said expander being adapted for being pushed together by said jack so that forward movement of the new rigid pipes causes forward movement of said expander and corresponding breakage of the underground pipe.

2. The underground pipe replacement apparatus of claim 1, wherein said expander includes a cone-shaped rear portion having a diameter so as to push underground pipe parts into the surrounding earth, and a plurality of fins positioned in front of said cone-shaped expander, said fins being immovable with respect to said expander.

3. The underground pipe replacement of claim 1, wherein said expander has no moving parts which moves relative to each other for breaking the underground pipe.

4. The underground pipe replacement apparatus of claim 1, further including an elongate member removeably attached to said expander, said elongate member having attached thereto a plurality of fins for moving inside the underground pipe for cracking the underground pipe and to allow said expander to follow the path of the underground pipe.

5. The underground pipe replacement apparatus of claim 4, further including an elongate snout positioned in front of said elongate finned member for following the underground pipe to define for said expander.

6. The underground pipe replacement apparatus of claim 5, wherein said elongate snout includes a plurality of similar components joined together in an end-to-end relationship.

7. The underground pipe replacement apparatus of claim 4, wherein said elongate snout finned member is removably connected to said expander.

8. The underground pipe replacement apparatus of claim 1, wherein said jack defines a first jack, and further including a second jack disposed between the new rigid pipes and said expander for exerting an axial force therebetween to thereby force said expander in a forward direction to break up the underground pipe and form said bore.

9. The underground pipe replacement apparatus of claim 8, wherein said second jack includes an adapter, said adapter having a rear edge shaped complementary to a frontal edge of one new rigid pipe of the new rigid pipes.

10. The underground pipe replacement apparatus of claim 8, wherein said second jack is adapted for operation between a front-most new rigid pipe and said expander.

11. The underground pipe replacement apparatus of claim 1, wherein said jack is operated with a hydraulic fluid.

12. The underground pipe replacement apparatus of claim 1, further including in combination the new rigid pipes that have a length such that a pipe replacement operation can be carried out in a manhole.

13. The underground pipe replacement apparatus of claim 1, further including an elongate snout pushed by said expander for maintaining a path of said expander through the underground pipe.

14. The underground pipe replacement apparatus of claim 11, wherein said expander includes a bore therein for allowing fluids to flow therethrough between said underground pipe and said new rigid pipes during replacement of the underground pipe.

15. The underground pipe replacement apparatus of claim 14, further including an elongate snout pushed by said expander, and wherein said snout includes a bore therethrough for allowing the fluids to flow therethrough to said bore in said expander.

16. The underground pipe replacement apparatus of claim 1, further including an elongate member for pushing said expander, said elongate member having a diameter for engaging the bore to thereby form a straight bore through which the new rigid pipe is pushed.

17. The underground pipe replacement apparatus of claim 16, wherein said expander and said elongate member includes an interface contact surface, said interface contact surface characterized by being an annular and planar surface area for straightening the path of the underground pipe.

18. Apparatus for replacing old underground pipes using new pipes, the new pipes characterized by being rigid and adapted for withstanding jacking forces, comprising;
    a jack for forcing the new rigid pipes into a path of the old underground pipes for replacement thereof;
    an expander positioned in front of the new rigid pipes so as to be pushed forwardly by said jack, said expander being shaped for expanding the old underground pipes radially outwardly for breakage thereof and for forming a bore for movement therein of the new rigid pipes when said expander is pushed forwardly; and
    an elongate sleeve disposed behind and engaged with said expander, said sleeve being of a length for causing the path of the old underground pipe to be effectively straightened when said expander is pushed in the path of the old underground pipes.

19. The underground pipe replacement apparatus of claim 18, wherein said expander is cone shape.

20. The underground pipe replacement apparatus of claim 18, where said in sleeve is removably attached to said expander.

21. A method for replacing an underground pipe using new replacement pipe sections wherein the new replacement pipe sections are characterized as being rigid and adapted for withstanding jacking forces, comprising the steps of:
    pushing an expander into a path of the underground pipe, and using forward motion of said expander without roller cutters rotatable about respective axes generally aligned with an axis of the underground pipe to break up the underground pipe and force broken parts of the underground pipe into the surrounding earth, and using the forward motion of said expander to form a burrow in the path of the underground pipe;
    interposing the new rigid replacement pipe sections behind said expander so that when the new rigid replacement pipe sections are pushed, said expander is pushed ahead by the new rigid sections;
    pushing the new rigid replacement pipe sections forwardly by a force exerted on the new rigid replacement pipe sections to thereby force said expander forwardly to form the burrow and at the same time advance the new rigid replacement pipe sections forwardly in the path of the underground pipe; and
    leaving the new rigid replacement pipe sections in the burrow in replacement of the underground pipe.

22. The method of claim 21, wherein said expander is cone shape.

23. The method of claim 21, further including replacing the underground pipe with the new rigid replacement pipe sections from a manhole.

24. The method of claim 23, further including coupling various components of an underground pipe replacement apparatus together so that the components can be individually lowered into the manhole and then coupled together.

25. The method of claim 21, further including the step of pushing on the new rigid replacement pipe sections with a jack located at a rear of the new rigid replacement pipe sections.

26. The method of claim 21, wherein said expander has a smooth conical surface, and further including pushing a finned member in front of the expander to fracture the underground pipe.

27. The method of claim 26, further including an elongate snout in front of said finned member so that the path of the underground pipe is followed.

28. The method of claim 27, wherein said elongate snout includes a plurality of substantially identical sections, each section constructed so as to be removably attached to each other.

29. The method of claim 27, wherein said expander, said finned member and said elongate snout are removably attached together by couplers.

30. The method of claim 29, wherein said couplers comprise male/female engaging members.

31. The method of claim 21, further including maintaining a path of said expander by using an elongate snout in front of said expander.

32. The method of claim 21, further including forming said burrow straight by pushing on said expander with an elongate member that engages the sidewalls of said burrow.

33. The method of claim 21, further including allowing liquid from the underground pipe to flow through said expander to said new replacement pipe sections during replacement of the underground pipe.

* * * * *